United States Patent [19]

Takayama

[11] 4,457,018
[45] Jun. 26, 1984

[54] RADIO TELEPHONE SYSTEMS AND METHOD FOR USE IN VEHICLES

[75] Inventor: Yoshikazu Takayama, Tokyo, Japan

[73] Assignee: Nippon Electric Co., Ltd., Tokyo, Japan

[21] Appl. No.: 491,087

[22] Filed: May 3, 1983

Related U.S. Application Data

[63] Continuation of Ser. No. 234,003, Feb. 12, 1981, abandoned.

[30] Foreign Application Priority Data

Feb. 19, 1980 [JP] Japan ................................. 55-18484

[51] Int. Cl.³ ............................................. H04B 1/00
[52] U.S. Cl. ...................................... 455/33; 455/54; 455/79; 179/2 EB
[58] Field of Search ....................... 455/33, 34, 54, 56, 455/79; 179/2 EB

[56] References Cited

U.S. PATENT DOCUMENTS

| | | | |
|---|---|---|---|
| 3,555,424 | 1/1971 | Malm | 455/54 |
| 3,581,013 | 5/1971 | Muller | 455/54 |
| 3,707,679 | 12/1972 | Bruley et al. | 455/54 |
| 4,025,853 | 5/1977 | Addeo | 455/33 |
| 4,103,105 | 7/1978 | Akiyama et al. | 455/79 |
| 4,144,409 | 3/1979 | Utano et al. | 179/2 EB |
| 4,144,412 | 3/1979 | Ito et al. | 455/33 |
| 4,281,413 | 7/1981 | Forrest | 455/34 |
| 4,308,429 | 12/1981 | Kai et al. | 455/33 |

OTHER PUBLICATIONS

Sakamoto et al., "Mobile Unit for 800 MHz Band Land Mobile Telephone System", Review of the Electrical Communication Laboratories, vol. 25, Nos. 11-12, pp. 1231-1244, Nov.-Dec. 1977.

Nagatsu et al., "Base Station Radio Equipment for 800 MHz Band Land Mobile Telephone System", Review of the Electrical Communication Laboratories, vol. 25, Nos. 11-12, pp. 1145-1154, Nov.-Dec. 1977.

Kamata et al., "800 MHz Band Land Mobile Telephone Radio System", Review of the Electrical Communication Laboratories, vol. 25, Nos. 11-12, pp. 1157-1171, Nov.-Dec. 1977.

Yoshikawa et al., "800 MHz Band Land Mobile Telephone Control System", Review of the Electrical Communication Laboratories, vol. 25, Nos. 11-12, pp. 1172-1190, Nov.-Dec. 1977.

*Primary Examiner*—Jin F. Ng
*Attorney, Agent, or Firm*—Blakely, Sokoloff, Taylor & Zafman

[57] ABSTRACT

A vehicle radio telephone system is constructed to talk between a vehicle and a fixed station through any one of a plurality of radio channels. Upon degradation of a talking condition during talking, the radio channel is switched and a tone is sent to talkers to inform them that the radio channel is now being changed.

8 Claims, 6 Drawing Figures

RADIO TELEPHONE SYSTEMS AND METHOD FOR USE IN VEHICLES

This is a continuation of application Ser. No. 234,003 filed Feb. 12, 1981, now abandoned.

BACKGROUND OF THE INVENTION

This invention relates to a radio telephone system and method for use in a vehicle, for example a motor car, more particularly a radio telephone system capable continuing communication by changing channels when a vehicle moves from a radio zone to another radio zone.

In a prior art moving radio telephone system, for example, in a system disclosed in U.S. Pat. No. 4,144,409 a service area is divided into a plurality of many small radio zones each installed with a base station (BS). Several radio zones are grouped into a control zone in which a radio control center cc is installed. The radio control center is connected to a conventional telephone exchange office (JEO).

In the vehicle radio system of the type described above, since the service area is divided into a number of small radio, zones, there are many chances in which a vehicle moves into another radio zone from one radio zone during speech. At time of passing through the boundary the speech condition becomes poor. For this reason, it is necessary to change the speech channel to the speech channel of the new radio zone in order to maintain the talking. According to a prior art system, due to the channel switching, the talking is temporarily interrupted whereby the vehicle and a stationary telephone set would be brought a soundless or talking impossible state. As a consequence, the talkers can not judge whether such state is caused by the channel switching or termination of the talking.

Regarding such vehicle radio telephone system there are the following publications:

(1) Sakamoto et al "Mobile Unit for 800 MHz Band Land Mobile Telephone System", Review of the Electrical Communication Laboratories, Vol. 25, Nos. 11-12. pp 1231-1244, November-December, 1977, (2) Nagatsu et al "Base Station Radio Equipment for 800 MHz Band Land Mobile Telephone System", Review of the Electrical Communication Laboratories, Vol. 25, Nos. 11-12, pp 1245-1254, November-December, 1977, (3) Kamata et al "800 MHz Band Land Mobile Telephone Radio System" Review of the Electrical Communication Laboratories, Vol 25, Nos. 11-12, pp. 1157-1171, November-December, and (4) Yoshikawa et al "800 MHz Band Land Mobile Telephone Control System" Review of the Electrical Communication Laboratories, Vol. 25, Nos. 11-12, pp 1172-1190, November-December, 1977.

SUMMARY OF THE INVENTION

An object of this invention is to provide an improved vehicle radio telephone system and method which informs to the talkers the fact that the channel is being switched at the time of changing a speech channel.

Another object of this invention is to provide a novel vehicle telephone system and method, in which the talkers are informed of the fact that the radio channel is now being switched so that they can know whether a toneless state is caused by the channel switching or termination of the talking.

According to one aspect of this invention, there is provided a vehicle radio telephone system comprising a vehicle and a fixed station which can talk each other through a plurality of radio channels and means for switching a speech path from one radio channel to the other during speech so as to continue talking, wherein means is provided for informing to talkers of the fact that the radio channel is now being switched at at least one of the vehicle and the fixed station.

According to another aspect of this invention there is provided a method for a vehicle radio telephone system of the type comprising a vehicle, first and second base stations respectively installed in first and second radio zones, control station connected to the first and second base stations for controlling talking between a subscriber on the vehicle and a stationary subscriber, and means for switching radio channels when the vehicle moves from one radio zone to the other so as to continue talking, characterized in that the method comprises the steps of detecting at the first base station field intensity from the vehicle for producing a detection signal; producing a first tone in response to the detection signal; sending the first tone to the stationary subscriber; causing the first base station to send out a control signal in response to the detection signal; receiving the control signal at the vehicle for generating a second tone which is sent to the subscriber on the vehicle; establishing a radio channel between the second base station and the vehicle; and stopping generation of the first and second tones subsequent to establishment of the radio channel.

DESCRIPTION OF THE PREFERRED EMBODIMENT

Figure 1:
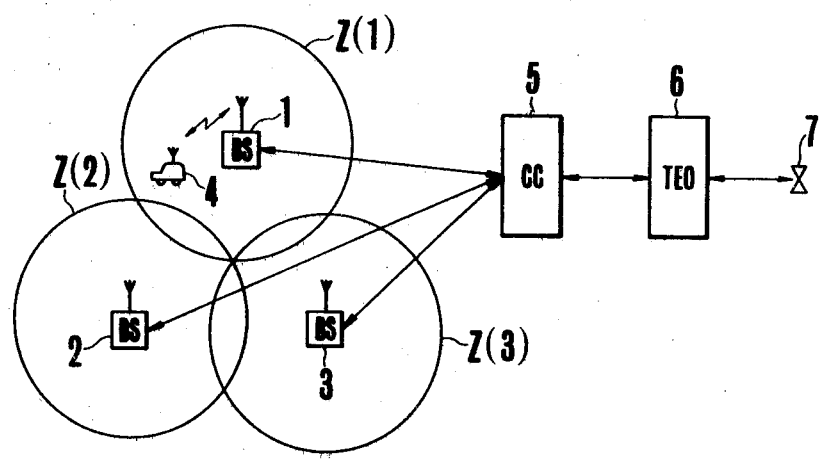
FIG. 1 is a diagrammatic representation of a radio telephone system embodying the invention and utilized in motor cars.

FIG. 1 shows a small radio zone vehicle (motor car) radio telephone system comprising radio base stations (hereinafter, merely called a base station) 1, 2 and 3 respectively allocated with radio zones Z(1), Z(2) and Z(3) which are limited to effective areas in which electric waves of respective base stations are effective or can reach. A vehicle 4 is connected to the base station 1 through a common control channel (p-ch) and speech channels 211-21n, the base station 2 is connected through the common control channel (p-ch) and speech channels 221-22n, and the base station 3 is connected through the control channel and speech channels 231-23n. Base stations 1 to 3 are connected to a radio control station (hereinafter merely called a control station) respectively through telephone wires or wireless. The control station 5 is connected to a conventional telephone exchange office 6 connected to a stationary subscriber 7.

Figure 2:
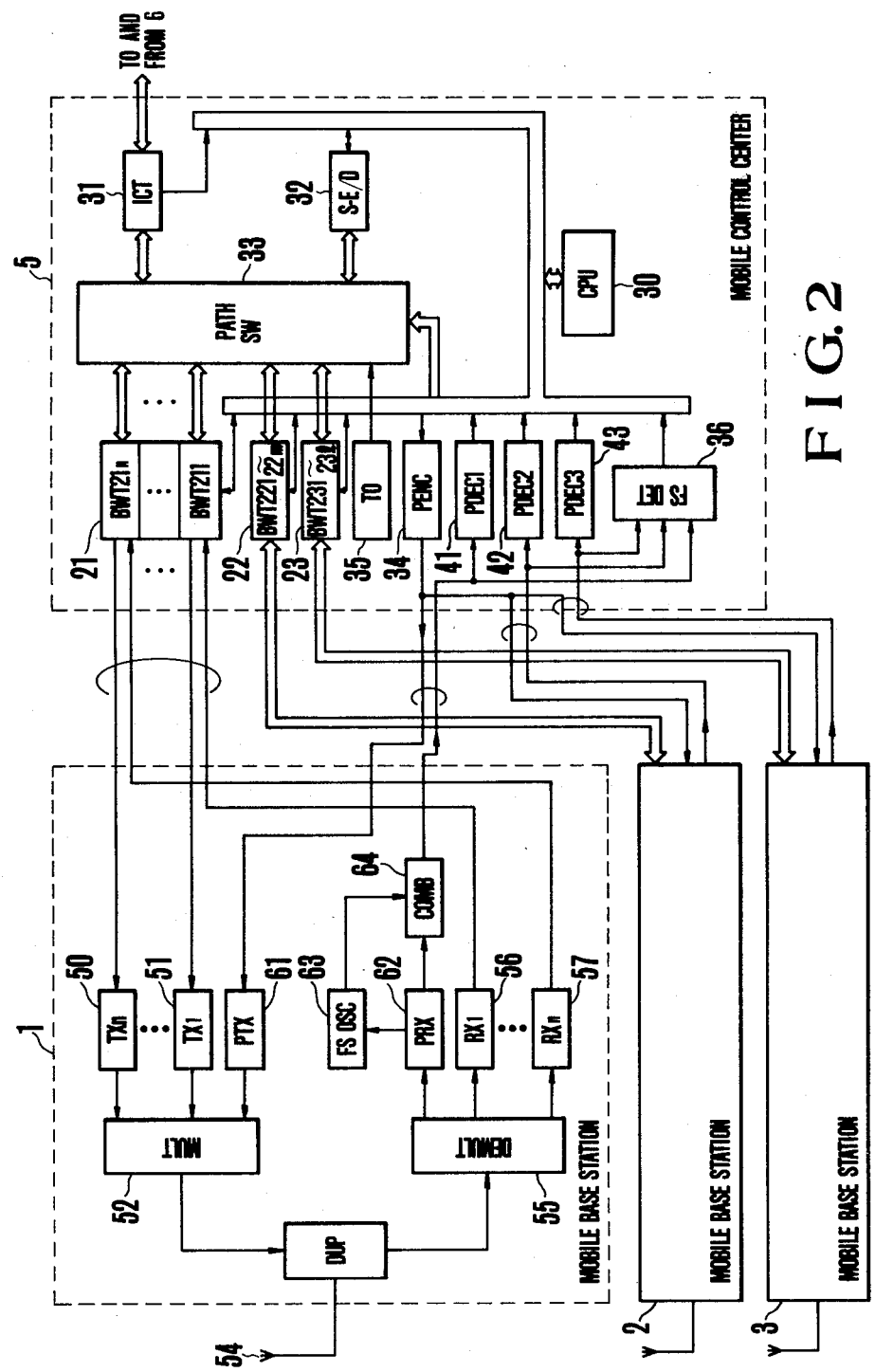
FIG. 2 is a block diagram showing one embodiment of a base station and a radio control station according to this invention.

The operation of the stationary subscriber 7 of exchanging talking with the vehicle 4 will be described with reference to FIGS. 2 and 3.

When the stationary subscriber dials an incoming trunk (ICT) 31 of the control station 5 receives a page code of the vehicle via the telephone exchange office 6. Then, a central processor unit (CPU) 30 starts a paging encoder (PENC) 34 to send the page code received by the incoming trunk 31 to base station 1, 2 or 3. The page code is sent to the vehicle from a page transmitter (PTX) 61 in each base station via a multiplexer 52, deplexer 53 and an antenna 54 through a page channel (p-ch).

A sequence controller 108 controls a synthesizer 107 such that the vehicle is prepared to wait for the talking through the channel. Consequently, the page code from a base station is received by a receiver 103 via the antenna 101 and the deplexer 102 and checked by the sequence controller 108. When the code received is the code of one station, the signal controller 108 actuates a data generator 111 to generate a page response code of its own office and to operate a transmitter 110, the page response code being sent to a base station via a page channel, deplexer 102 and antenna 101.

A page receiver (PRX) 62 in each of the base stations 1-3 belongs to the same channel so that the page response code transmitted from the vehicle 4 is received by more than one base stations. The page receiver 62 transmits the received page response code and a field intensity signal corresponding thereto to a combiner (COM) 64 and a field strength oscillator (FS OSC) 62 which converts the amplitude of the field intensity signal from the page receiver 62 into a frequency signal supplied to the combiner 64. The combiner 64 of each base station combines the page response code from the page receiver 62 with the signal from the field strength oscillator 63 to send the combined signal to page decoders (PDEC) 41-43 and a field strength detector (FSDET) 36 of the control station 5. The field strength detector 36 detects and compares the field strength signals from respective base stations for selecting a zone (in FIG. 1, Z(1) in which the field strength is the maximum, whereas the page decoders 41-43 decode page codes. The central processor 30 judges the presence or absence of the called vehicle 4 in the zone Z(1) in accordance with the output signal of the field strength detector 36 and the output signal of the page decoders 41-43 for selecting one (for example 211) of the speech channels 211-21n assigned to this zone. In other words, it selects an idle one (for example BWT 211) of the both way trunks (BWT). Furthermore, the central processor 30 controls a speech path switch (PATH SW) 33 to connect a speech channel encoder/decoder (S-E/D) 32 to a selected both way trunk 211 for sending a down channel confirmation code produced by the speech channel encoder/decoder 32 to the vehicle 4 via the speech path switch 33, both way trunk 211, transmitter 51, multiplexer 52, duplexer 53 and antenna 54. Also the central processor 30 sends to the vehicle 4 a channel designation signal from the page encoder 34 via page transmitter 61, multiplexer 52, duplexer 53 and antenna 54 so that the vehicle 4 can be connected to the desired both way trunk 211.

In the vehicle 4, when a channel designation signal is received by a page channel, the sequence controller 108 controls a synthesizer 107 to set a designated speech channel (s-ch) 211, thus receiving the down channel confirmation channel from the base station 1. Upon receival of the down channel confirmation signal, the sequence controller 108 starts a data generator 111 to cause a transmitter Tx10 to send an up channel confirmation signal through the speech channel 211.

The receiver 56 in the base station 1 receives the up channel confirmation signal from the vehcile 4 via antenna 54, duplexer 53, both way trunk 211 and switch 33 and sends the received up channel confirmation signal to the speech channel encoder/decoder 32. When the central processor 30 confirms the fact that the speech channel encoder/decoder 32 has received the up channel confirmation signal, in other words the fact that the channel between the vehicle 4 and the stationary subscriber 7 has been established, a ring code is sent to the vehicle 4 from the speech channel encoder/decoder via switch 33, both way trunk 211 and transmitter 51. The controller 108 of the vehicle 4 detects this ring code to actuate a bell 113. When the subscriber or driver of the vehicle hooks off its handset, the data generator 111 transmits an off hook code to the base station 1 while at the same time switch 104 is being closed to render the vehicle 4 to enable to talk.

Figure 4:
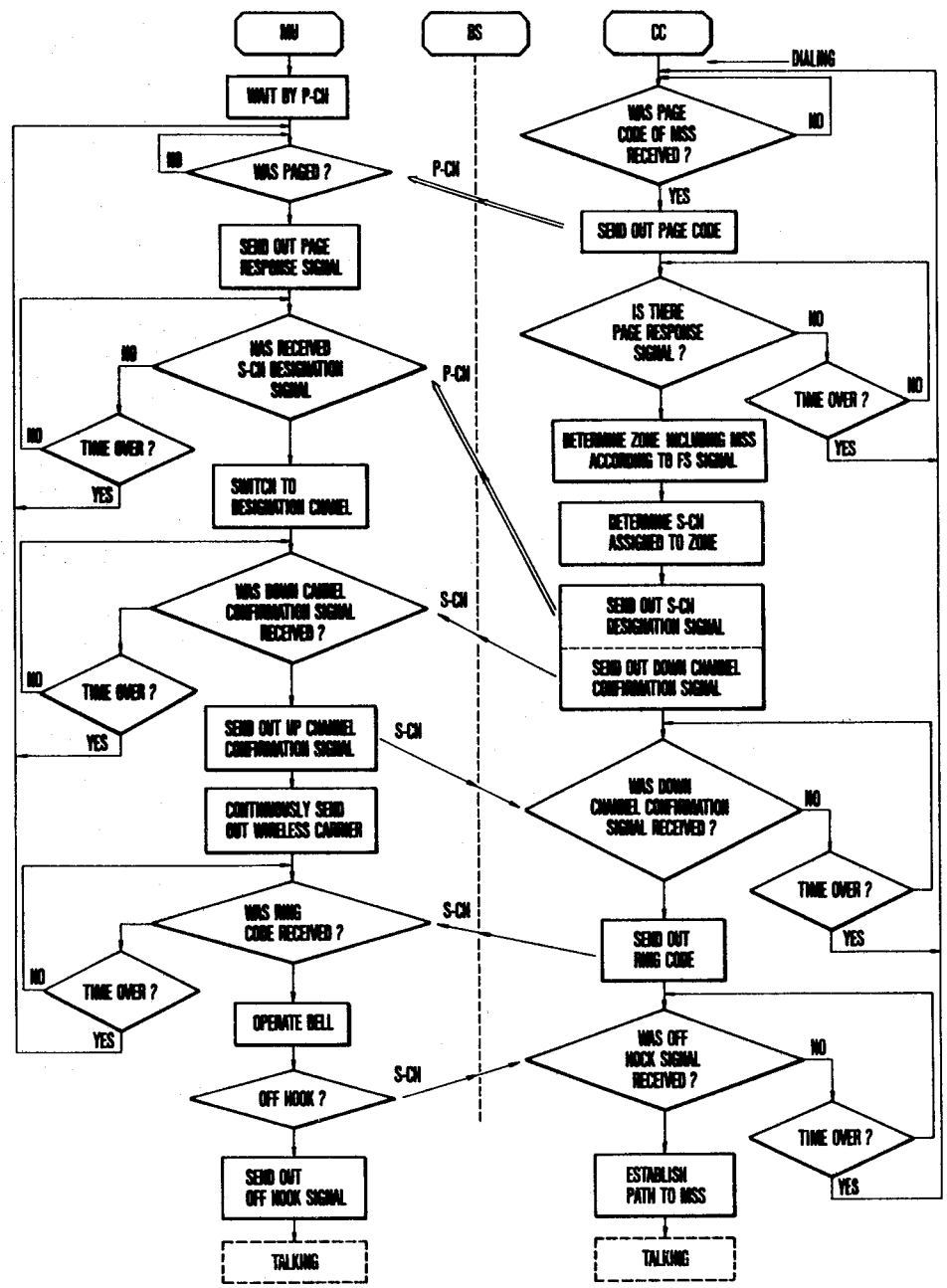
FIG. 4 is a flow chart showing an operation made from a conventional telephone exchange to a vehicle.

When the off hook code is received by the speech channel encoder/decoder (S-E/D) 32 via receiver 56, both way trunk and switch 33, the central processor controls the switch 33 to interrupt the path between the speech channel encoder/decoder 33 and the both way trunk 211 and to connect the latter to the incoming trunk 31 to enable talking. Accordingly, the talking between the stationary subscriber 7 and the vehicle 4 becomes possible. The operation described above is shown in FIG. 4. When the vehicle 40 moves from a zone Z(1) to another zone Z(2) while talking, it is necessary to switch the present speech channel 211 to one of the speech channels 221—221 of the new zone Z(2) as has been described above. When the speech channel is switched in this manner, the talking is interrupted, although in a very short time, thus causing not one state giving uneasy feeling to the talkers.

In the following, one example of eliminating the uneasy feeling by informing channel switching to the talkers by using a tone or the like will be described.

As above described, before the switching the talkers exchange speech via the speech channel 211 so that the incoming trunk 31 is connected to the both way trunk 211.

As the vehicle 4 moves into the zone Z(2) from the zone Z(1), and when the field intensity at the vehicle 4 of the wave radiated from the base station 1 decreases below a predetermined value, the receiver (RX) 56 produces an OFF/ON signal, for example, and transmits it to the both way trunk 211. The central processor 30 checks the OFF/ON signal on the both way trunk 201, to know that the vehicle 4 has moved from the zone Z(1) into the other zone Z(2) or Z(3), thus starting the channel switching.

At first the central processor 30 controls the switch 33 to interrupt the path between the both way trunk 211 and the incoming trunk 31 and to connect the latter to a tone oscillator (TO) 35 to send to the stationary subscriber 7 a tone representing that the channel is now being switched via the telephone exchange office. Thus, the both way trunk 211 and the speech channel encoder/decoder 32 are interconnected to send to the vehicle 4 a voting request signal from the speech channel encoder/decoder 32 via switch 33, both way trunk 211 and transmitter 51.

The controller 108 of the vehicle 4 monitors the voting request signal from the base station 1, and when the controller receives the voting signal, the switch 105 is thrown to the side of the tone oscilltor 109 to send the tone to the receiver 106 thus informing to the subscriber on the vehicle the fact that the channel is now being switched. Further, the sequence controller 108 turns OFF the transmitter 110 and drives a synchronizer 107 to switch to the page channel and then causes a data generator 111 to produce a voting response signal which turns ON the transmittor 110 while it sends out a signal. The voting response signal is sent to all base stations via the page channel, the page receiver 62 of each of the base station 1, 2 and 3 receives and demodulates the voting response signal and demodulated signal is converted into a frequency signal by the field strength oscillator 63 for generating a field intensity signal. The voting response signal and the field intensity signal received by the page receiver 62 are sent to the control center 5 via the combiner 64.

In the control center 5, the output signals of the combiners 64 of respective base offices are inputed to page decoder 41, 42 or 43 and the field intensity detector 361 which detects and compares the field strength signals FS from respective base station to select a zone Z(2) in which the field intensity is the maximum. In the same manner as above described, the central processor 30 changes the channel to an idle channel, for example 221 among page channels 221–22n assigned to the zone Z(2). More particularly, the path between the both way trunk 211 and the speech channel encoder/decoder 32 is interrupted and a new path between the both way trunk 221 of the both way trunks 22 and the speech channel encoder/decoder 32 is established. Then, like the paging flow described above the speech channel encoder/decoder 32 sends a down line confirmation signal to the vehicle 4 via the base station 2, so as to connect the vehcile to a new both way trunk 221, while the page encoder 34 sends a channel switching signal to the vehicle 4 through the paging transmitter 61 of the base station 2.

In the vehicle, when a channel designation signal is received through the page channel the central processor 108 sets the synthesizer 107 to the designated page channel 221 for receiving the down line confirmation signal. Then the central processor 108 sends out the up line confirmation signal from the data generator 111 via channel 221.

The up line confirmation signal received by the receiver 56 in the base station 1 is inputted to the speech channel encoder/decoder 32 via the both way trunk 221 and the switch 33. When the speech channel encoder/decoder 32 receives the up line confirmation signal, a path is formed so that the central processor 30 interrupts the path between the speech encoder/decoder and the both way trunk 221 to terminate the down line confirmation signal and interrupt the path between the central processor 35 and the incoming trunk 31, whereby the channel switching tone is stopped to interconnect the incoming trunk 31 and the both way trunk 221 to restore the talking state.

Figure 5:
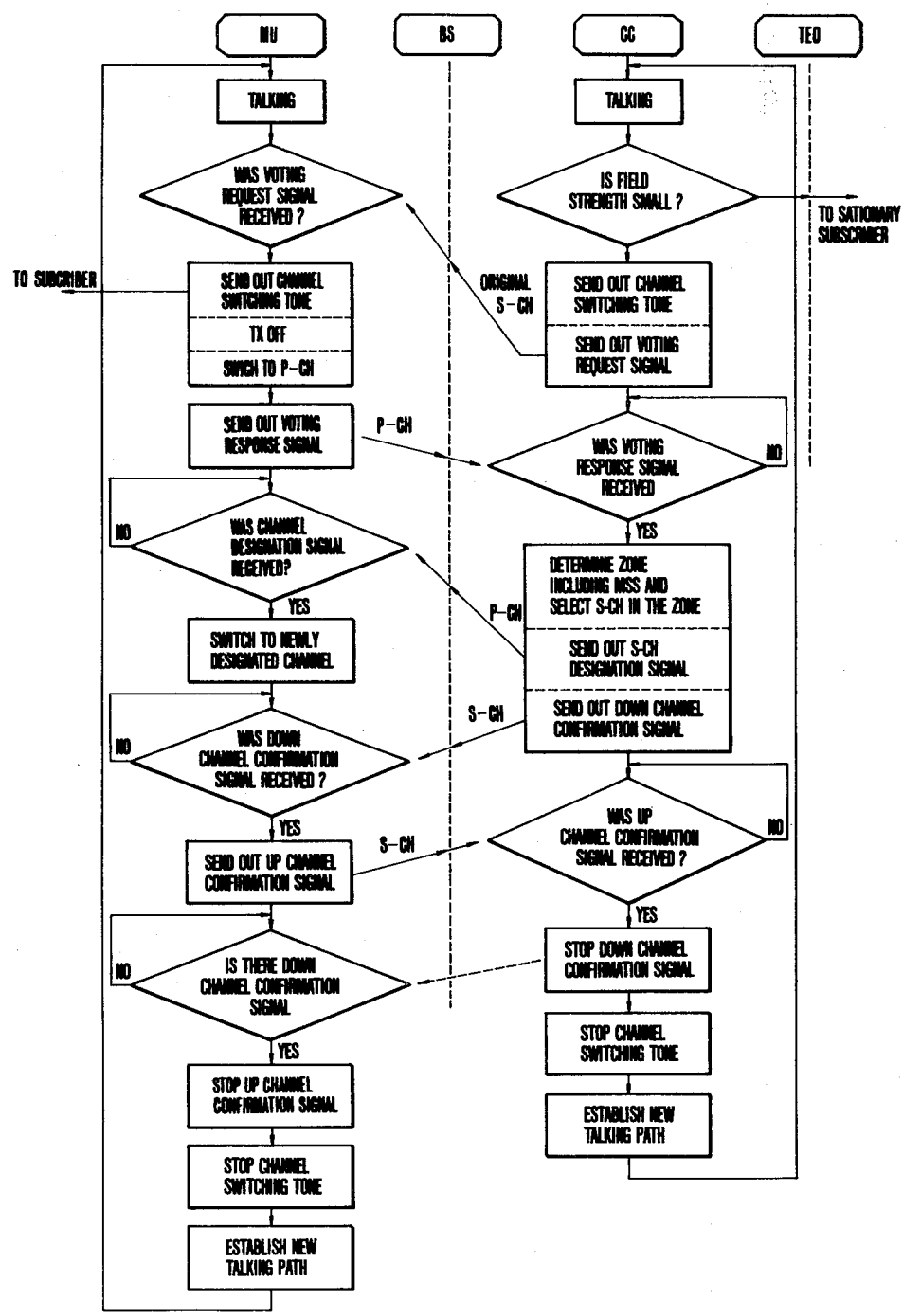
FIG. 5 is a flow chart showing the channel switching operation according to this invention and FIG. 6 is a block diagram showing another embodiment of a vehicle station embodying the invention.

The sequence controller 108 of the vehicle 4 confirms that the down line confirmation signal has stopped to stop the sending out of the up line confirmation signal from the data generator and opens the switch 105 to disconnect the tone generator 109 from the receiver 109 and to connect the receiver 103 to stop the channel switching tone, thus restoring the talking. FIG. 5 is a flow chart showing the operation described above.

Figure 3:
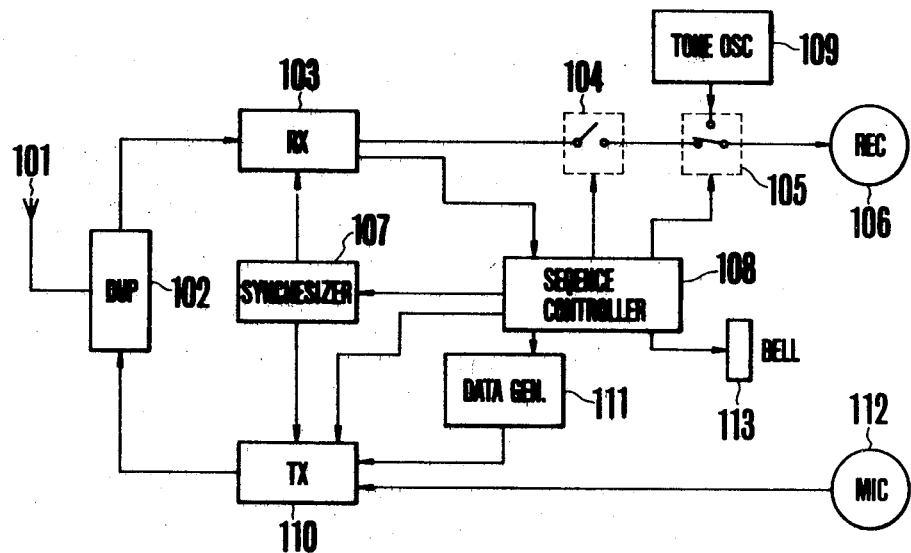
FIG. 3 is a block diagram showing one example of a vehicle station mounted on a vehicle.
Figure 6:
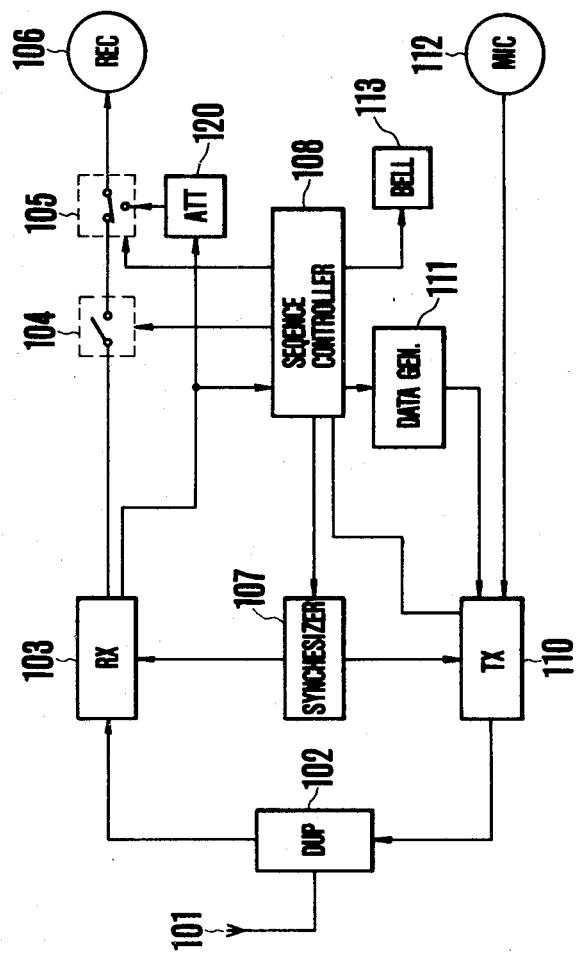

FIG. 6 shows a modified embodiment of this invention in which a control signal for channel switching, for example a voting request signal from a speech channel, a channel designation signal from a paging channel, or a down line confirmation signal from the speech channel is utilized in the vehicle 4 instead of a tone from the tone oscillator 109 shown in FIG. 3. In FIG. 3, the control signal is sent to a receiver 106 via ATT 120 and a switch 105 to inform the control signal to a talker. Elements corresponding to those shown in FIG. 3 are designated by the same reference charactors.

Although in the foregoing embodiments channel switching is informed to both the stationary subscriber and the vehicle subscriber, only one of the subscribers may be informed.

Although in the foregoing embodiments, the vehicle was illustrated as a motor car it should be understood that the invention is also applicable to any other vehicle, i.e., ships, trains, aircrafts, etc.

What is claimed is:

1. In a vehicle radio telephone system comprising a moving vehicle and a fixed station for voice communication utilizing a plurality of radio channels, said fixed station and said moving vehicle including means for switching a speech path from one radio channel to a second radio channel to maintain voice communication between the moving vehicle and fixed station, the improvement which comprises means included within said moving vehicle and said fixed station for informing at least one subscriber using said telephone system that said one radio channel is being switched to said second radio channel, wherein said informing means informs said at least one subscriber that said channel is being switched by generating an audible tone signal during the channel switching.

2. The vehicle radio telephone system according to claim 1 wherein said informing means converts a control signal sent from one of said control stations to said vehicle into said audible tone signal.

3. The vehicle radio telephone system according to claim 1 wherein said informing means comprises means for generating said audible tone signal during said channel switching, and means for producing said tone signal as an audible tone.

4. In a vehicle radio telephone system comprising a moving vehicle, a plurality of base stations respectively installed in a plurality of radio zones, at least one control station coupled to selected ones of said plurality of base stations for controlling voice communication between said vehicle and a selected one of said base stations depending on the location of the vehicle, said control station, said base stations and said moving vehicle including means for switching between first and second radio channels used for voice communication when said vehicle moves from one radio zone into a second radio zone during voice communication to maintain voice communication, the improvement which comprises means included within said moving vehicle and said control station for informing subscribers using said telephone system that said first radio channel is being switched to said second radio channel, wherein said informing informing means informs said subscribers that said channel is being switched by generating an audible signal tone during the channel switching.

5. The vehicle radio telephone system according to claim 4 wherein said informing means comprises means for generating said audible tone signal during said channel switching, and means for producing said tone signal as an audible tone.

6. The vehicle radio telephone system according to claim 4 wherein said informing means converts a control signal sent from one of said control stations to said vehicle into said audible tone signal.

7. In a vehicle radio telephone system comprising a vehicle, first and second base stations respectively installed in first and second radio zones, a control station connected to said first and second base stations for controlling voice communication between a subscriber on said vehicle and a stationary subscriber, and means for switching radio channels from a first channel to a second channel when said vehicle moves from one radio zone to the other so as to maintain the voice communication, and means for informing the subscribers that the first radio channel is being switched to the second radio channel, a method which comprises the steps of:

detecting at said first base station the field intensity from said vehicle for producing a detection signal;
  producing a first tone in response to said detection signal;
  sending said first tone to said stationary subscribed to inform said stationary subscriber that the channel switching is taking place;
  causing said first base station to send out a control signal in response to said detection signal;
  receiving said control signal at said vehicle for generating a second tone which is sent to said subscriber on said vehicle to inform said subscriber that the channel switching is taking place;
  establishing a radio channel between said second base station and said vehicle; and
  stopping generation of said first and second tones subsequent to establishment of said radio channel to inform said subscribers that the switching of said channels has been completed.

8. A moving vehicle for use in a vehicle radio telephone system, including means for communicating with a base station by using one of first and second channels, means for switching a speech path from said first radio channel to said second radio channel to maintain voice communication with another base station, and means for informing a subscriber using said moving vehicle that said channels are being switched by generating an audible signal tone during the channel switching.

* * * * *